Patented Dec. 25, 1951

2,579,663

UNITED STATES PATENT OFFICE 2,579,663

PROCESS OF SYNTHESIZING HYDROCARBONS

William L. Gilbert and Charles W. Montgomery, Oakmont, Pa., assignors to Gulf Research & Development Company, Pittsburgh, Pa., a corporation of Delaware No Drawing. Application December 15, 1948, Serial No. 65,527

5 Claims. (Cl. 260—449.6)

This invention relates to a process for synthesizing hydrocarbons; more particularly the invention relates to a process for synthesizing normally liquid hydrocarbons from carbon monoxide and steam.

The reaction between carbon monoxide and steam has been employed in the past for the manufacture of hydrogen. This reaction has been carried out in the presence of catalysts, at a temperature in the neighborhood of 900° to 950° F. and at substantially atmospheric pressures. The products of reaction consist of hydrogen and carbon dioxide, together with unconverted steam and carbon monoxide.

We have now discovered that carbon monoxide and steam can be reacted so as to produce among the products of the reaction an important yield of normally liquid hydrocarbons; i. e., hydrocarbons that are liquid at atmospheric temperature and pressure conditions. Thus, we have found that such liquid hydrocarbons can be produced by reacting carbon monoxide and steam in the presence of a solid catalyst and at a temperature of about 400° to about 700° F. and a pressure of above 100 pounds per square inch. This process is advantageous in that the raw materials for the process are relatively inexpensive and the products include not only the valuable liquid hydrocarbons, but also a proportion of hydrogen which is available for use in hydrogenation processes such as the Fischer-Tropsch synthesis process involving the reaction between carbon monoxide and hydrogen.

In carrying out the process of the invention, the charge mixture of carbon monoxide and steam is preferably prepared before being brought in contact with the catalyst. The ratio of carbon monoxide to steam in the charge mixture has an important effect upon the results achieved. While the reaction produces hydrocarbons when using carbon monoxide and steam in mol ratios from about 0.5:1 to about 3:1, we have found that the most effective results are obtained when using ratios from about 1:1 to about 2:1. When a lesser amount of carbon monoxide is used, the yield of hydrocarbons falls rapidly, and when a greater quantity of this reactant is included in the charge mixture, carbon is produced which is deposited in the pores of the catalyst, resulting in the rapid destruction of the physical form of the catalyst. This physical decomposition of the catalyst causes, in a fixed bed operation, rapid increase in pressure drop across the catalyst bed, and in operations where the catalyst is caused to move through the reaction chamber, the production of catalyst fines which are lost from the system.

The reaction between carbon monoxide and steam as accomplished in the present process is highly exothermic and therefore it is important that the reaction zone be effectively cooled. If the reaction temperature is permitted to rise above about 700° F., the products of the reaction are substantially entirely hydrogen and carbon dioxide. When the reaction is carried out by passing the charge mixture in contact with a fixed bed of catalyst, the temperature should be controlled by the use of suitable heat exchange means such as cooling coils, tubes and reactor jackets or by high recycle ratios. The process may also be carried out by using the catalyst in fluidized state or by passing the catalyst through the reactor as a moving bed. In these cases the temperature control may be effected by the use of heat exchange means or by using high catalyst circulation rates or both. We have found that the production of hydrocarbons is most efficient when the temperature is maintained between about 500° and about 600° F., and preferably between about 550° and about 600° F.

The reaction pressure is an important feature of the process. We have found that when reacting carbon monoxide and steam at atmospheric pressure normally liquid hydrocarbons are not obtained even though all of the other conditions of the process are optimum. To produce reasonable yields of hydrocarbons, the pressure should be maintained above 100 pounds per square inch, and preferably between about 150 and about 300 pounds per square inch. Although higher pressures do not appear to have an adverse effect, the use of such pressures introduces operating difficulties and, therefore, pressures above about 600 pounds per square inch are undesirable.

Any suitable solid catalyst may be employed in the process. We have found that the reaction is especially sensitive to the specific nature of the catalyst. Thus, in accordance with a preferred embodiment of the invention, a mixture of carbon monoxide and steam is contacted, under the conditions described above, with an iron catalyst which is from about 50 to about 100 per cent reduced from the oxide. We have discovered that by proceeding in this way good yields of the desired normally liquid hydrocarbons are obtained. In accordance with another preferred embodiment of the invention, we have found that a cobalt catalyst which is from about 40 to about 80 per cent reduced, and is preferably about 50 to about 75 per cent reduced, from the cobalt oxide, is an effective catalyst for this reaction. The particular effectiveness of catalysts of these types for the reaction is somewhat surprising because related catalysts, such as a completely oxidized iron catalyst or a completely reduced cobalt catalyst, have been found, under the conditions employed in the research work leading to the development of this invention, to produce at best only very small yields of the desired hydrocarbons.

Accordingly, while the invention includes in its broader aspects the use of any suitable solid catalyst, particularly a suitable synthesis catalyst, it will be understood that these catalysts will vary greatly in respect of their effectiveness in the present process depending upon the degree of oxidation or reduction of the catalyst. In referring to synthesis catalysts we intend to indicate the catalysts that have been employed or proposed for use in the synthesis of hydrocarbons by the Fischer-Tropsch process, preferably catalysts comprising metals of group VIII of the periodic table; especially the iron group metals, iron, cobalt, and nickel. The catalysts may be supported on any suitable supports such as diatomaceous earth, silica gel, alumina, activated clays, bauxite, activated carbon and kieselguhr, and they may contain promoters, examples of which are alumina, potassium oxide, magnesium oxide, calcium oxide, copper and thoria.

In order that the invention may be understood more fully reference should be had to the following specific examples.

EXAMPLE I

A series of reactions were carried out using an iron catalyst in several stages of reduction. This catalyst was a pelleted precipitated iron oxide which analysis indicated was essentially $Fe_2O_3$ although it contained traces of other metals. To prepare this catalyst for use as a reduced oxide, it was first dried at 750° F. and then was reduced by passing hydrogen over it at a pressure of about one atmosphere while maintaining temperatures of about 750° F. The percentage reduction was determined by using the ratio between the water formed in the reduction of the catalyst and the theoretical amount of water that would be produced by complete reduction. As an example, complete reduction of 100 grams of dry $Fe_2O_3$ will produce 33.8 grams of water. If the reduction is carried out in the above manner so as to produce 22 grams of water, then the percentage reduction is $22/33.8 \times 100$ or 65 per cent. This catalyst is referred to as a 65 per cent reduced iron catalyst.

As shown in the following Table I, several iron catalysts were used in which the conditions of operation were varied as shown in the table. The reactor employed contained a fixed bed of the catalyst and was provided with heat exchange means to maintain the temperature of the catalyst bed fairly constant throughout the run. The products of the reaction were collected and analyzed as shown.

Table I

| Run No. | 1 | 2 | 3 | 4 | 5 |
|---|---|---|---|---|---|
| Per Cent Reduction of Catalyst | 98.6 | 70 | 52.0 | 0 | 100 |
| Mol Ratio $CO/H_2O$ of charge | 1.73 | 1.99 | 1.93 | 1.86 | 2.0 |
| Space Velocity (Vol. charge at S. T. P./Vol. Catalyst/Hour) | 483 | 483 | 463 | 478 | 498 |
| Average Reactor Temperature, °F | 575 | 575 | 575 | 575 | 575 |
| Pressure-pounds per sq. inch gauge | 150 | 150 | 150 | 150 | 0 |
| Gaseous Product Analysis-Vol. Per Cent: | | | | | |
| $CO_2$ | 62.6 | 65.6 | 67.7 | 4.2 | 30.9 |
| CO | 4.3 | 6.2 | 4.4 | 86.1 | 38.9 |
| $H_2$ | 25.7 | 19.7 | 17.6 | 9.6 | 26.4 |
| $CH_4$ | 2.8 | 3.0 | 3.8 | Trace | 0.6 |
| $C_3^+$ | 3.3 | 1.9 | 3.3 | do | 0.7 |
| Yield-lbs. liquid hydrocarbons per MCF CO | 2.32 | 2.0 | 2.3 | None | None |

It will be seen from this table, Run No. 5, that although all of the other conditions were substantially optimum, the use of atmospheric pressure resulted in an operation in which no liquid hydrocarbons were formed. Also, comparison of runs Nos. 1 and 4 will show the relation between the effectiveness of a substantially completely reduced iron catalyst and an unreduced or oxidized iron catalyst.

EXAMPLE II

In this example the catalyst employed was a familiar type of synthesis catalyst consisting of cobalt impregnated on kieselguhr and promoted with thoria having the composition by weight of 45.9 per cent cobalt oxide, 8.2 per cent thoria, and 45.9 per cent kieselguhr. As obtained the catalyst was in the substantially completely oxidized state. To prepare reduced or partially reduced catalysts, the catalyst was treated by passing hydrogen over it at a temperature of about 650° to about 750° F. and at a pressure of 150 pounds per square inch gauge and a space velocity of 400 in some runs and at atmospheric pressure and a space velocity of 4000 in other runs. The per cent reduction of each catalyst was determined as described in Example I.

The following Table II shows the results obtained using various cobalt catalysts prepared by reduction with hydrogen as described when reacting carbon monoxide and steam as described in Example I.

Table II

| Run No. | 11 | 12 | 13 | 14 | 15 | 16 |
|---|---|---|---|---|---|---|
| Per Cent Reduction of Catalyst | 55.5 | 73.3 | 50.6 | 93.5 | 0 | 51.8 |
| Mol Ratio $CO/H_2O$ of charge | 1.43 | 1.0 | 0.50 | 1.0 | 1.0 | 1.84 |
| Space Velocity (Vol. charge at S. T. P./Vol. Catalyst/Hour) | 434 | 544 | 333 | 500 | 500 | 471 |
| Average Reactor Temperature °F | 575 | 575 | 575 | 575 | 575 | 575 |
| Pressure-pounds per sq. inch gauge | 150 | 150 | 150 | 150 | 150 | 150 |
| Gaseous Product Analysis Vol. Per Cent: | | | | | | |
| $CO_2$ | 50.0 | 63.9 | 38.2 | 70.5 | 2.8 | 41.5 |
| CO | 27.9 | 4.3 | 35.2 | 0.4 | | 41.8 |
| $H_2$ | 12.6 | 11.0 | 19.0 | 7.7 | | 8.8 |
| $CH_4$ | 6.3 | 11.4 | 4.0 | 17.8 | | 6.0 |
| $C_3^+$ | 2.1 | 2.3 | 0.9 | 2.2 | | 1.0 |
| Yield-lbs. liquid hydrocarbons per MCF CO | 1.0 | 0.8 | Trace | Trace | None | 0.43 |

It will be seen from the data given in Table II, that while normally liquid hydrocarbons were obtained when using a partially reduced catalyst in runs 11 and 13, at best only a trace of such hydrocarbons was obtained when using either substantially completely oxidized or substantially completely reduced catalyst. The data also show that when using a cobalt catalyst, the best results are obtained when the carbon monoxide/steam ratio is between 1.0 and 1.5.

The results obtained in the foregoing runs and other runs carried out in the research work in connection with the invention have indicated that the space velocity need not be restricted to narrow limits. In general, we prefer to employ space velocities of fresh feed within the range of about 200 to about 800 but both lower and higher fresh feed space velocities may be used by appropriate adjustment of the other conditions of the process.

Obviously many modifications and variations of the invention, as hereinbefore set forth, may be made without departing from the spirit and scope thereof, but only such limitations should be imposed as are indicated in the appended claims.

We claim:

1. A process for the production of normally liquid hydrocarbons which comprises contacting a mixture in which the reactants consist of carbon monoxide and steam in a mol ratio of carbon monoxide to steam of about 2:1 with an iron catalyst substantially completely reduced from the oxide at a pressure of about 150 to about 300 pounds per square inch and at an elevated conversion temperature from about 550° to about 600° F., and recovering normally liquid hydrocarbons from the resulting reaction products.

2. A process for the production of normally liquid hydrocarbons which comprises contacting a mixture in which the reactants consist of carbon monoxide and steam in a mol ratio of carbon monoxide to steam of about 1:1 to about 1.5:1 with a cobalt catalyst about 50 to about 75 per cent reduced from the oxide, at a pressure of about 150 to about 300 pounds per square inch and at an elevated conversion temperature from about 550° to about 600° F., and recovering normally liquid hydrocarbons from the resulting reaction products.

3. A process for the production of normally liquid hydrocarbons which comprises contacting a mixture in which the reactants consist of carbon monoxide and steam in a mol ratio of carbon monoxide to steam of about 1:1 to about 2:1 with a catalyst selected from the group consisting of an iron catalyst about 50 to about 100 per cent reduced from the oxide and a cobalt catalyst about 40 to about 80 per cent reduced from the oxide, at a pressure of about 100 to about 600 pounds per square inch, and at an elevated conversion temperature from about 500° to about 600° F., and recovering normally liquid hydrocarbons from the resulting reaction products.

4. A process according to claim 3 in which said catalyst is an iron catalyst about 50 to about 100 per cent reduced from the oxide.

5. A process in accordance with claim 3 in which said catalyst is a cobalt catalyst about 40 to about 80 per cent reduced from the oxide.

WILLIAM I. GILBERT.
CHARLES W. MONTGOMERY.

REFERENCES CITED

The following references are of record in the file of this patent:

UNITED STATES PATENTS

| Number | Name | Date |
|---|---|---|
| 2,213,415 | Slatineanu | Sept. 3, 1940 |
| 2,257,293 | Dreyfus | Sept. 30, 1941 |

OTHER REFERENCES

Fischer: Conversion of Coal into Oil, July 18, 1925, pages 217–219.